United States Patent
Kofuji et al.

(10) Patent No.: US 7,512,641 B2
(45) Date of Patent: Mar. 31, 2009

(54) DATA PROCESSING SYSTEM, STORAGE DEVICE AND COMPUTER PROGRAM

(75) Inventors: Yoshiyuki Kofuji, Nara (JP); Masahiro Sakiyama, Osaka (JP); Masaki Higashiura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 752 days.

(21) Appl. No.: 11/064,194

(22) Filed: Feb. 22, 2005

(65) Prior Publication Data

US 2005/0192928 A1  Sep. 1, 2005

(30) Foreign Application Priority Data

Feb. 27, 2004  (JP)  ............... 2004-054777

(51) Int. Cl.
   *G06F 17/30*  (2006.01)
(52) U.S. Cl. .............. 707/204; 707/1; 707/10; 707/100; 707/200
(58) Field of Classification Search ............ 707/1, 707/10, 100, 200, 204; 709/220; 713/193
   See application file for complete search history.

(56) References Cited

U.S. PATENT DOCUMENTS 5,564,033 A  10/1996  Takekuma et al.
7,334,135 B2 *  2/2008  Asoh et al. .............. 713/193
2002/0161740 A1 *  10/2002  Nakamura et al. ............ 707/1
2004/0015573 A1 *  1/2004  Yuki et al. .............. 709/220

FOREIGN PATENT DOCUMENTS

| JP | 07-013699 | 1/1995 |
| JP | 08-244317 | 9/1996 |
| JP | 11-194986 | 7/1999 |
| JP | 2002-366532 | 12/2002 |
| JP | 2003-030356 | 1/2003 |
| JP | 2003-122517 | 4/2003 |
| JP | 2003-122652 | 4/2003 |

* cited by examiner

*Primary Examiner*—Pierre M Vital
*Assistant Examiner*—Fred I Ehichioya
(74) *Attorney, Agent, or Firm*—Edwards Angell Palmer & Dodge LLP; David G. Conlin; Peter J. Manus

(57) ABSTRACT

A data processing device, such as a facsimile machine or a printer, sends setting information necessary for processing data to a storage device for a back-up purpose, etc., and the storage device stores the setting information of the data processing device. The storage device classifies the data processing device according to whether or not the data processing device has a data protection function for protecting data to be processed, and stores the setting information in association with a type in which the data processing device is classified. When sending the setting information to a data processing device, the storage device sends the setting information corresponding to the type in which the data processing device as a recipient is classified.

10 Claims, 7 Drawing Sheets

FIG. 4

| | DEVICE IDENTIFICATION INFORMATION | UPDATED DATE | |
|---|---|---|---|
| PRESENCE OF DATA PROTECTION FUNCTION | xxxxx | 2003.X.X.12:00 | SETTING INFORMATION |
| | xxxxO | 2003.X.X.17:00 | SETTING INFORMATION |
| | ... | ... | ... |
| ABSENCE OF DATA PROTECTION FUNCTION | xxxOx | 2004.X.X.12:00 | SETTING INFORMATION |
| | xxxOO | 2004.X.X.17:00 | SETTING INFORMATION |
| | ... | ... | ... |
| | xxOxx | 2004.X.X.12:00 | ENCRYPTED SETTING INFORMATION |
| | ... | ... | ... |

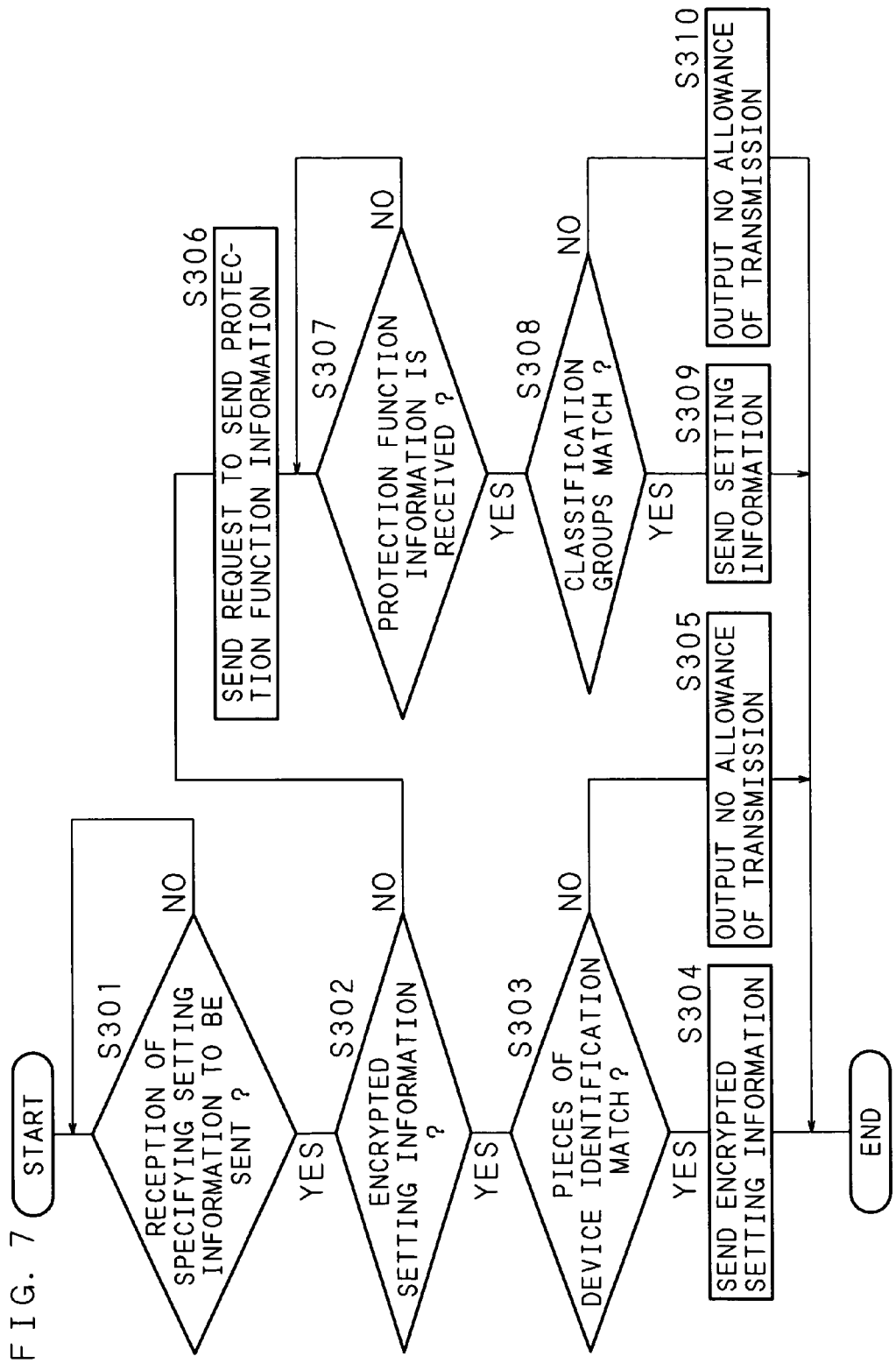

DATA PROCESSING SYSTEM, STORAGE DEVICE AND COMPUTER PROGRAM

CROSS-REFERENCE TO RELATED APPLICATION

This non-provisional application claims priority under 35 U.S.C. §119(a) on Patent Application No. 2004-54777 filed in Japan on Feb. 27, 2004, the entire contents of which are hereby incorporated by reference.

BACKGROUND OF THE INVENTION

The present invention relates to a data processing system in which setting information necessary for an operation of a data processing device such as a facsimile machine or a printer is stored in a storage device external to the data processing device, and also relates to the storage device and a computer program.

A data processing device, such as a facsimile machine or a printer, stores setting information necessary for processing data, such as information specifying the data processing device itself such as a telephone number or an IP address, identification information for identifying a user of the data processing device, and information showing a recipient of data, and processes data based on the contents of the setting information. In general, these pieces of setting information are manually inputted by the user into the data processing device, and stored, for example, in a memory mounted on a control substrate in the data processing device.

When the data processing device or the control substrate of the data processing device is replaced, or when the contents of the setting information were lost by an accident, it is necessary to input the setting information again into the data processing device, and thus there is the problem that a lot of time is required. Moreover, in general, since a plurality of data processing devices are used in an office or the like, there is the problem that it takes a lot of time to input the setting information into the respective data processing devices.

Therefore, a technique was developed. In this technique, a storage device for storing the setting information is provided separately from a data processing device, a backup copy of the setting information of the data processing device is stored in this storage device, and the setting information is returned to the data processing device when necessary. Japanese Patent Application Laid-Open No. 8-244317 (1996) discloses a technique in which a plurality of data processing devices are connected with network, and one data processing device which also functions as a storage device stores the setting information of other data processing devices and inputs the stored setting information into an arbitrary data processing device when necessary. With this technique, it is possible to easily input the setting information again into the data processing device, input the setting information into a new data processing device, and simultaneously input the setting information into a plurality of data processing devices.

The data to be processed by a data processing device may include confidential data such as text containing confidential information of a business, or transaction documents to customers. In order to protect such confidential data, data processing devices capable of processing data while encrypting the data or restricting users have been used. The setting information stored in such a data processing device includes various types of confidential information, such as information showing a recipient of data which is a customer, information showing the user, and the encryption key when the data is encrypted. However, with the use of a technique in which the setting information is stored in a storage device different from the data processing device like the technique disclosed in above-mentioned Japanese Patent Application Laid-Open No. 8-244317 (1996), since the setting information containing confidential information can be inputted into another data processing device, there is the problem that it is impossible to manage the confidential information.

BRIEF SUMMARY OF THE INVENTION

The present invention has been made with the aim of solving the above problems, and it is an object of the present invention to provide a data processing system, a storage device and a computer program, capable of managing setting information obtained from a data processing device that handles setting information containing confidential information while preventing leakage of the setting information when managing the setting information obtained from the data processing device.

A data processing system according to the present invention is a data processing system including a plurality of data processing devices comprising setting information storage means for storing setting information necessary for processing data, and a storage device to which the plurality of data processing devices are connected, wherein the data processing device comprises means for sending the setting information stored in the setting information storage means to the storage device, and the storage device comprises: classification storage means for storing the setting information sent from the data processing device in association with a classification group in which the data processing device which sent the setting information is classified according to a predetermined condition; means for receiving a transmission request to send the stored setting information to one data processing device; means for classifying the one data processing device according to the predetermined condition when the transmission request is received; and means for sending to the one data processing device the setting information stored in the classification storage means in association with a classification group in which the one data processing device is classified.

A storage device according to the present invention is a storage device including receiving means for receiving, from an external data processing device, setting information necessary for processing data in the data processing device, for storing the setting information received by the receiving means, and comprises: classification storage means for storing the setting information received by the receiving means in association with a classification group in which the data processing device which sent the setting information is classified according to a predetermined condition; means for receiving a transmission request to send the setting information stored in the classification storage means to an external data processing device; means for classifying the external data processing device according to the predetermined condition when the transmission request is received; and means for sending to the external data processing device the setting information stored in the classification storage means in association with a classification group in which the external data processing device is classified.

A storage device according to the present invention further comprises: means for receiving, from an external data processing device, protection function information showing whether or not the data processing device has a data protection function for protecting data to be processed, or showing strength of protecting data by a data protection function; and means for classifying the external data processing device according to the presence or absence of the data protection function or the strength of protecting data by the data protection function as the predetermined condition, based on the received protection function information.

A storage device according to the present invention further comprises: means for receiving, from an external data processing device, encrypted setting information produced by encrypting setting information necessary for processing data in the data processing device; means for storing the received encrypted setting information; means for sending the stored encrypted setting information to the data processing device which sent the encrypted setting information; and means for prohibiting the encrypted setting information from being sent to a data processing device other than the data processing device which sent the encrypted setting information.

A computer program according to the present invention is a computer program for causing a computer to store setting information received from an external data processing device and necessary for processing data in the data processing device, and comprises the steps of causing the computer to store the received setting information in association with a classification group in which the data processing device which sent the setting information is classified according to a predetermined condition; causing the computer to classify the external data processing device according to the predetermined condition when a transmission request to send the stored setting information to an external data processing device is received; and causing the computer to select, as the setting information to be sent to the external data processing device, the setting information stored in association with a classification group in which the external data processing device is classified.

According to the present invention, the storage device for storing setting information necessary for processing data in a data processing device stores the setting information received from a data processing device in association with a classification group in which the data processing device is classified according to a predetermined condition, and, when sending the setting information to a data processing device, the storage device sends the setting information corresponding to the classification group of the data processing device to which the setting information is to be sent. Between the data processing devices classified as the same type of data processing device, since the setting information can be shared, it is possible to easily perform the process of inputting the setting information into a data processing device, such as inputting the setting information again into the data processing device or inputting the setting information into a new data processing device. Moreover, since sending and receiving of information are not carried out between data processing devices of different types, it is possible to prevent leakage of confidential information contained in the setting information stored in a data processing device handling confidential data to other data processing device.

Further, in the present invention, the storage device classifies a data processing device according to whether or not the data processing device has a data protection function for protecting data to be processed, or the strength of protecting data by the data protection function. It is therefore possible to prevent the setting information of a data processing device which handles confidential data because it has the data protection function from being sent to a data processing device which does not handle confidential data because it does not have the data protection function. Consequently, it is possible to prevent leakage of confidential information, such as information showing customers contained in the setting information stored in a data processing device handling confidential data, information showing the user, and the encryption key when the data is encrypted.

Additionally, in the present invention, the storage device is capable of receiving and storing encrypted setting information produced by encrypting the setting information, and the encrypted setting information can be sent only to a data processing device which sent this encrypted setting information. It is therefore possible to prevent leakage of confidential information contained in the setting information whose contents are protected by encryption to other data processing devices.

The above and further objects and features of the invention will more fully be apparent from the following detailed description with accompanying drawings.

BRIEF DESCRIPTION OF THE SEVERAL VIEWS OF THE DRAWINGS

FIG. 4 is a concept view showing an example of the contents of management data stored in an internal storage device;

FIG. 7 is a flowchart showing the procedure of sending specified setting information to a data processing device.

DETAILED DESCRIPTION OF THE INVENTION

The following description will explain specifically the present invention, based on the drawings illustrating an embodiment thereof.

Figure 1:
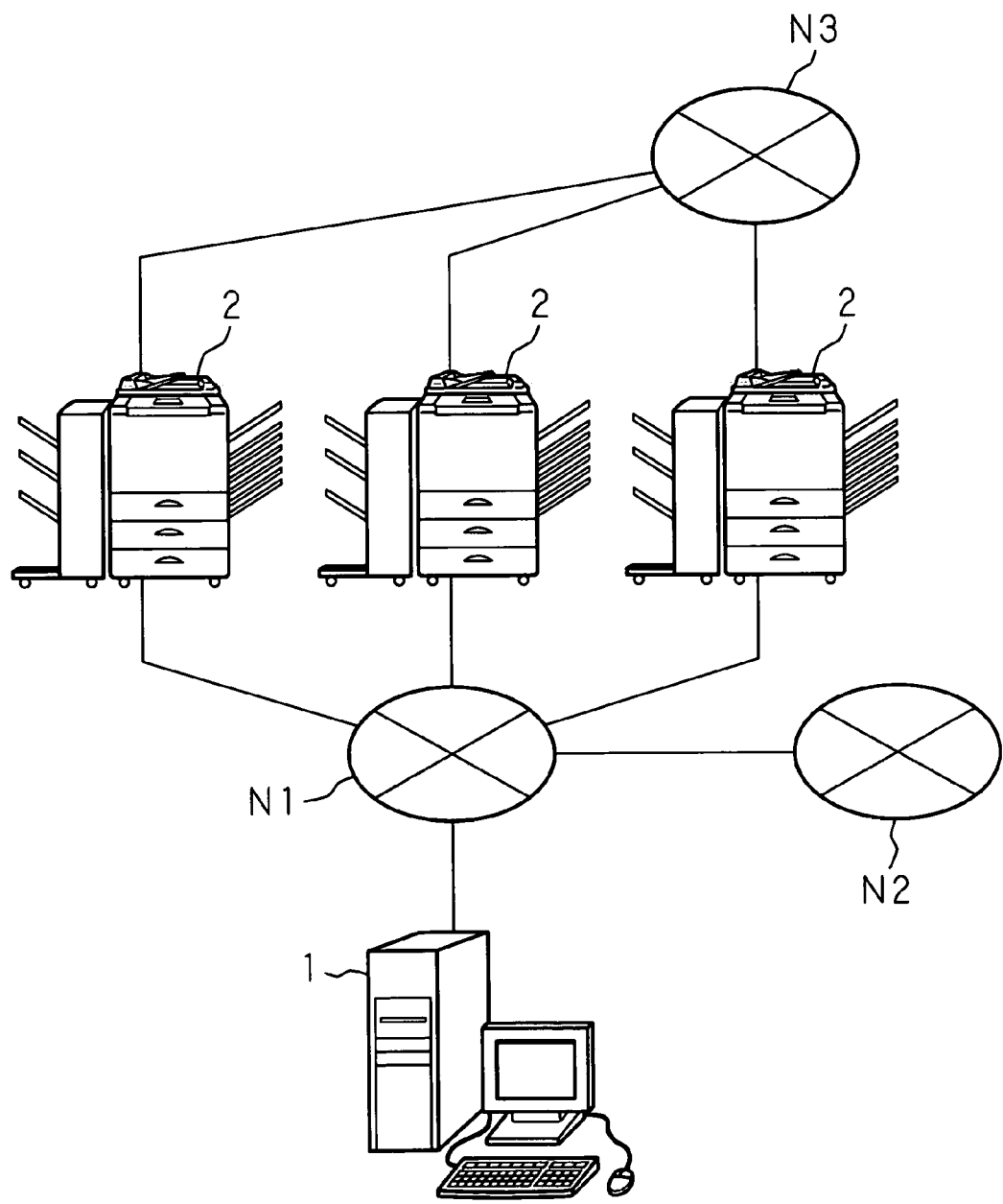
FIG. 1 is a block diagram showing the structure of a data processing system of the present invention.

FIG. 1 is a block diagram showing the structure of a data processing system of the present invention. A plurality of data processing devices 2, 2, . . . having the functions of a printer, facsimile machine, etc. are connected to a communication network N1 such as a LAN in an office. Moreover, a storage device 1 of the present invention is connected to the communication network N1. Further, the communication network N1 is connected to a wide-area communication network N2 such as the Internet. The data processing devices 2, 2, . . . are also connected to a public network N3.

Figure 2:
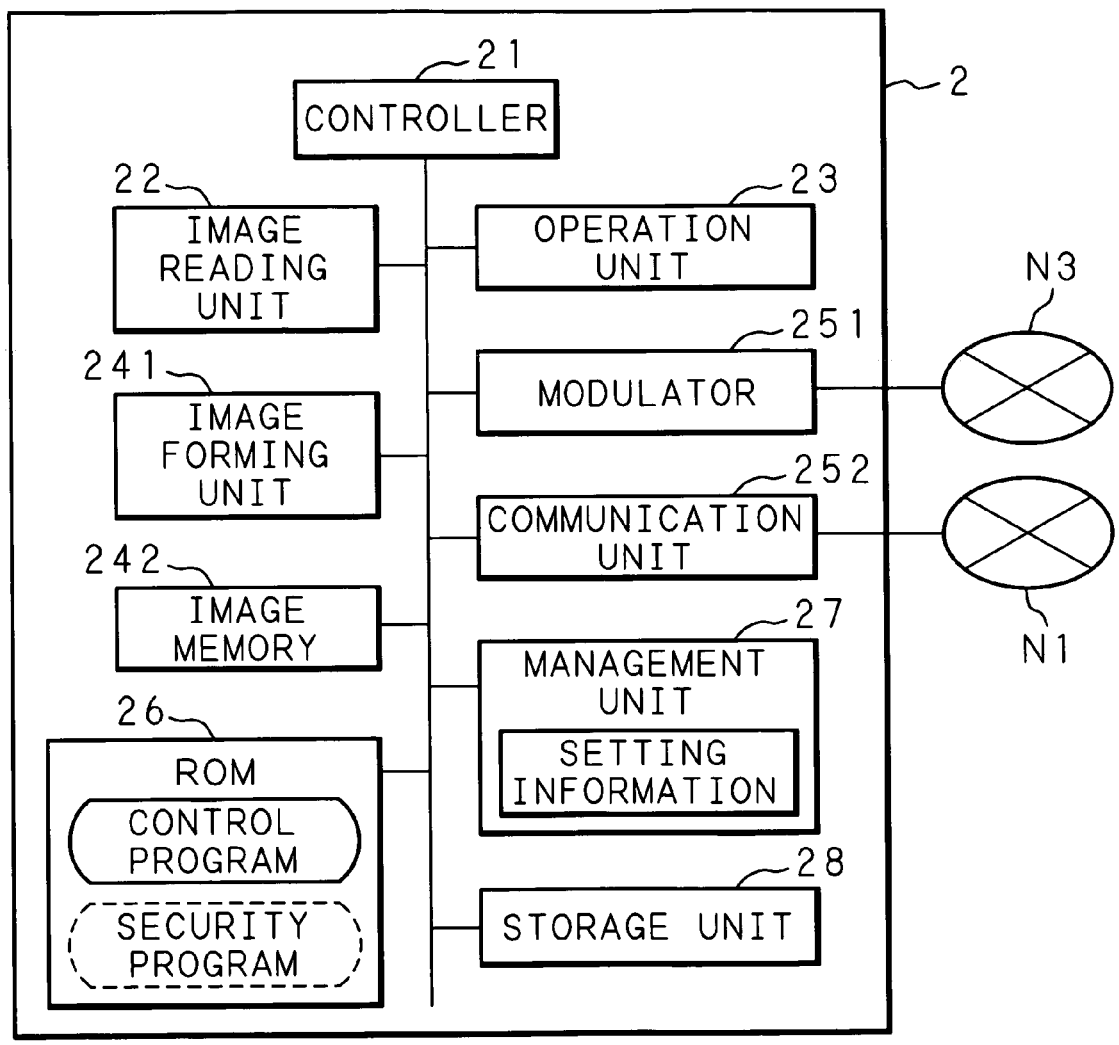
FIG. 2 is a functional block diagram showing the internal functional structure of a data processing device.

FIG. 2 is a functional block diagram showing the internal functional structure of the data processing device 2. The data processing device 2 comprises a controller 21 including a CPU for performing arithmetic operations and a RAM for storing temporary information generated by the arithmetic operations. Connected to the controller 21 are a ROM 26 storing a control program for controlling the data processing device 2, and a management unit 27 that is a memory for storing the management information for managing the processing performed by the data processing device 2. In addition, an image reading unit 22 for generating image data by reading an image recorded on recording paper is connected to the controller 21.

A modulator 251 for performing facsimile communication is connected to the controller 21, and is also connected to the public network N3. The data processing device 2 can send the image data generated by the image reading unit 22 to another facsimile machine by facsimile communication through the public network N3 connected to the modulator 251. Moreover, an image memory 242 for temporarily storing image data, and an image forming unit 241 for forming an image from the image data and recording the image on recording paper are connected to the controller 21. In the data processing device 2, the image data sent by facsimile communication from another facsimile machine through the public network N3 is received by the modulator 251, the received image data is stored in the image memory 242, and an image is formed from the stored image data by the image forming unit 241. Thus, the data processing device 2 functions as a facsimile machine.

Further, a communication unit 252 connected to the communication network N1 is connected to the controller 21. The communication unit 252 receives image data through the communication network N1 from an information processing device such as a personal computer (PC) connected to the communication network N1, and then the image forming unit 241 forms an image from the received image data. Thus, the data processing device 2 functions as a printer. In addition, the communication unit 252 can receive image data sent from an information processing device connected to the wide-area communication network N2 or another facsimile machine through the communication network N1 or the wide-area communication network N2 by a method in which the image data is attached to an electronic mail and sent. Thus, the data processing device 2 functions as an Internet facsimile machine.

Moreover, a storage unit 28 composed of a hard disk or an optical disk is connected to the controller 21. The storage unit 28 stores the image data processed by the data processing device 2. Further, an operation unit 23 for receiving an operation from a user is connected to the controller 21. The operation unit 23 comprises display means such as a liquid crystal panel for displaying information necessary for operations, and input means such as a touch panel or ten-key which is operated by the user to input information such as control instructions.

The management unit 27 is setting information storage means according to the present invention, and stores setting information necessary for the data processing device 2 to process image data for facsimile communication, such as a telephone number or IP address of the data processing device 2, and a telephone number or IP address of a recipient of the image data. The data processing device 2 is capable of sending the stetting information from the communication unit 252 to the storage device 1 through the communication network N1.

By the way, a plurality of data processing devices 2, 2, . . . include a data processing device 2 having a data protection function for protecting image data. The data processing device 2 having the data protection function is designed to handle image data containing confidential information of a business, or image data containing confidential data such as a transaction document to a specific customer, and protects the image data by performing encrypted communication, encrypting the image data stored in the storage unit 28, invalidating the processed image data, or restricting users. The ROM 26 of the data processing device 2 having the data protection function stores a security program in addition to a controller program. According to this security program, the process of protecting image data is executed. The setting information used by the data processing device 2 with the data protection function when processing data includes confidential information such as information showing a recipient of the data which is a customer, information showing the user, and the encryption key if the data is encrypted. Moreover, the data processing device 2 with the data protection function is also capable of storing encrypted setting information produced by encrypting the setting information in the management unit 27.

Figure 3:
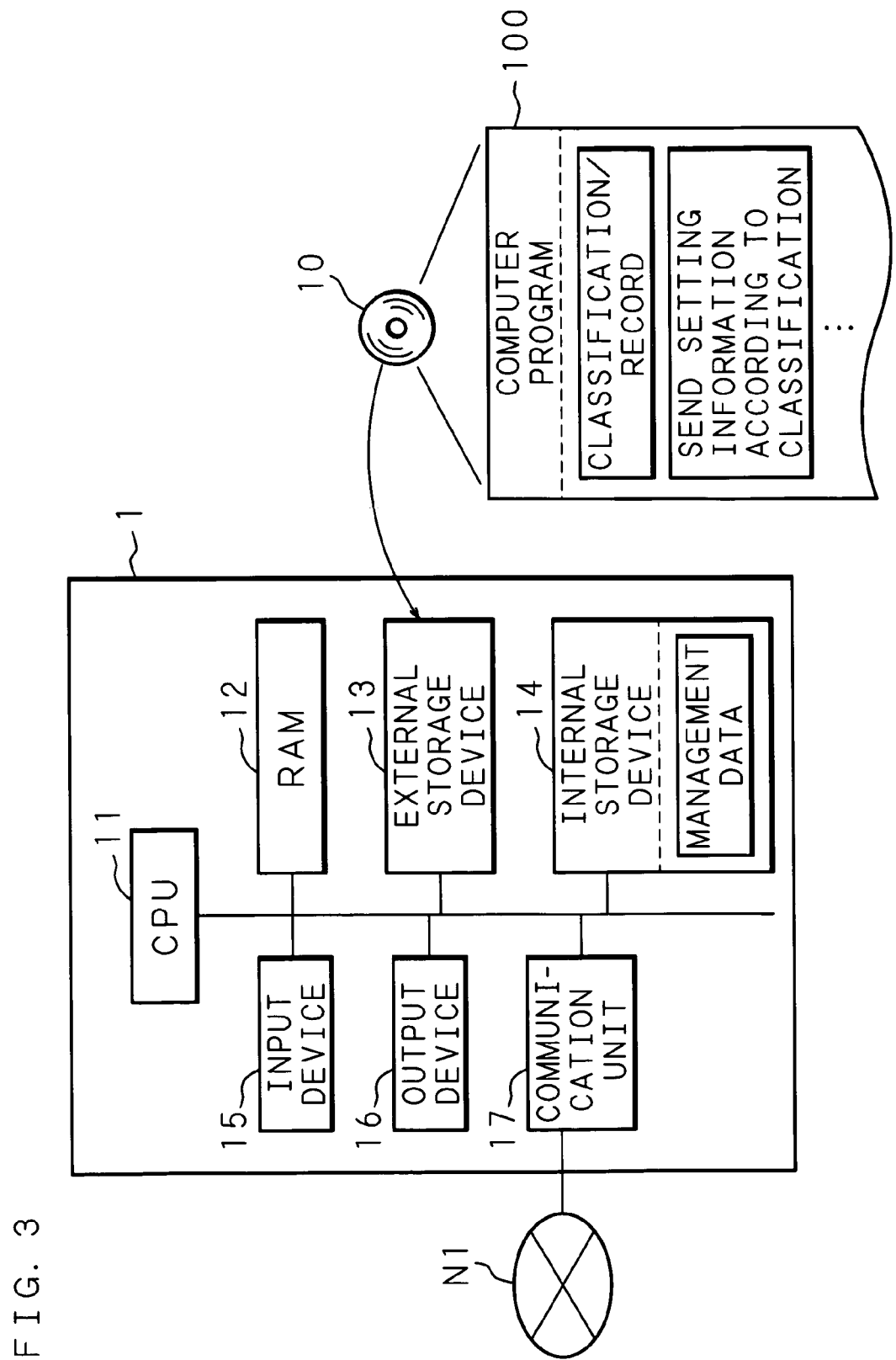
FIG. 3 is a block diagram showing the internal structure of a storage device of the present invention.

FIG. 3 is a block diagram showing the internal structure of the storage device 1 of the present invention. The storage device 1 is constructed using a server, and comprises a CPU 11 for performing arithmetic operations, a RAM 12 for storing temporary information generated by the arithmetic operations, an external storage device 13 such as a CD-ROM, and an internal storage device 14 such as a hard disk. The CPU 11 reads a computer program 100 of the present invention from a memory product 10 such as a CD-ROM by the external storage device 13, and stores the read computer program 100 in the internal storage device 14. The computer program 100 is loaded into the RAM 12 from the internal storage device 14 when necessary, and then the CPU 11 executes processes necessary for the storage device 1, based on the loaded computer program 100. The storage device 1 comprises an input device 15 such as a keyboard or a mouse, and an output device 16 such as a liquid crystal display or a CRT display, and can receive an operation of an operator such as data input. Further, the storage device 1 comprises a communication unit 17 connected to the communication network N1. The communication unit 17 receives the setting information sent from the data processing devices 2, 2, . . . through the communication network N1.

The internal storage device 14 is classification storage means according to the present invention, and stores management data in which the setting information sent from each of the data processing devices 2, 2, . . . is recorded in association with a classification group in which the data processing device 2 is classified. FIG. 4 is a concept view showing an example of the contents of the management data stored in the internal storage device 14. Device identification information for identifying each data processing device 2, such as a serial number, telephone number, or ID address of the data processing device 2, is classified according to whether or not the data processing device 2 has the data protection function. To correspond to each piece of classified device identification information, the setting information sent from the data processing device 2 shown by the device identification information is recorded. Moreover, the updated date of the setting information is recorded. Further, in the management data, encrypted setting information produced by encrypting the setting information is recorded in association with the device identification information showing a data processing device 2 which sent this encrypted setting information.

Figure 5:
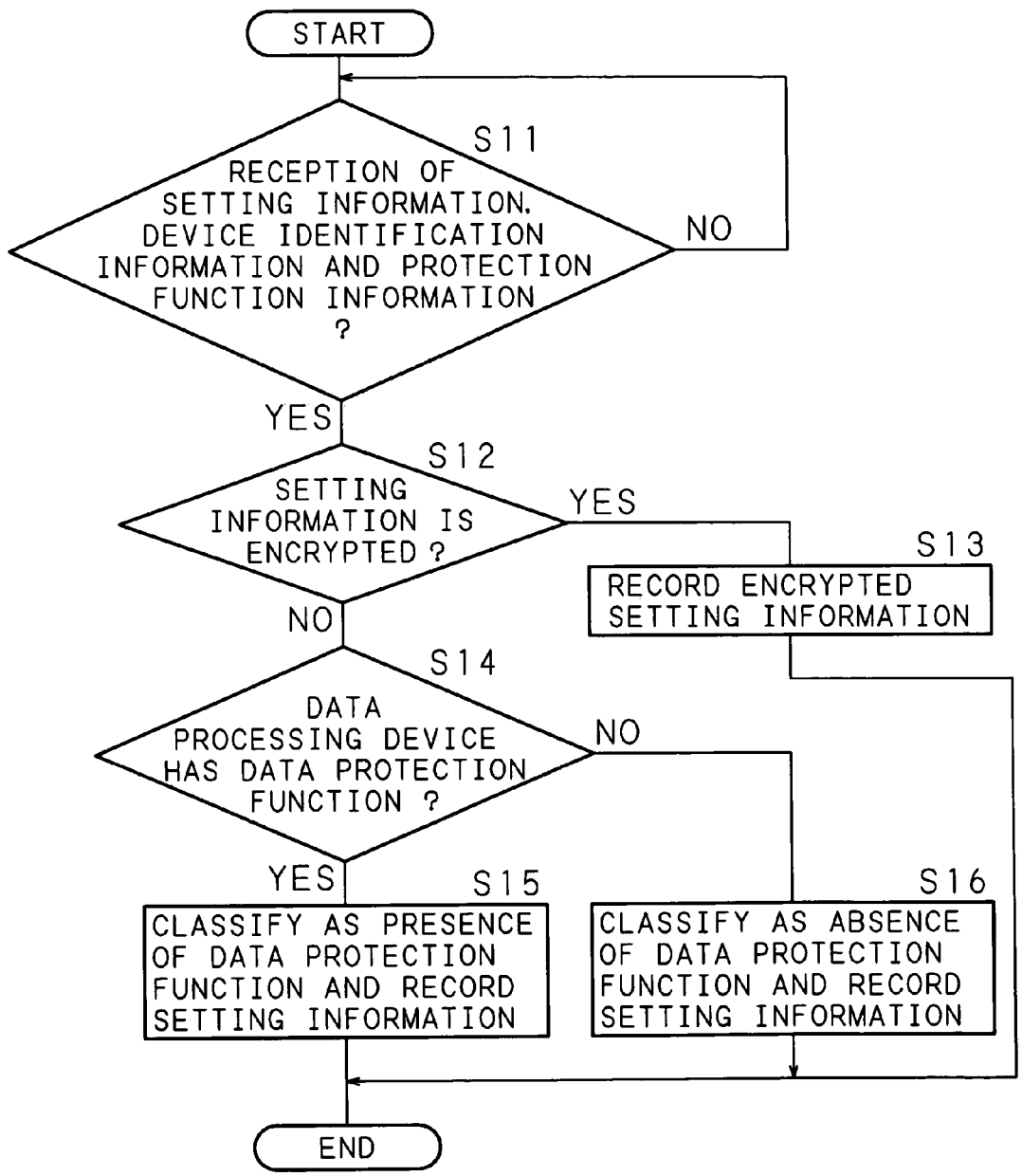
FIG. 5 is a flowchart showing the procedure of receiving and storing setting information by the storage device of the present invention.

FIG. 5 is a flowchart showing the procedure of receiving and storing the setting information by the storage device 1 of the present invention. The CPU 11 of the storage device 1 performs the following processes, according to the computer program 100 loaded into the RAM 12. The CPU 11 monitors the reception of the setting information, device identification information and protection function information showing whether or not the data processing device 2 has the data protection function sent from the data processing devices 2, 2, . . . connected to the communication network N1 in the communication unit 17 (S11). According to a sending instruction received periodically or when the user operates the operation unit 23 of the data processing device 2, the data processing devices 2, 2, . . . send the setting information, device identification information and protection function information to the storage device 1. Alternatively, according to an instruction received periodically or when the user operates the input device 15, the CPU 11 of the storage device 1 may request the data processing devices 2, 2, ... to send the setting information, device identification information and protection function information. It may also be possible to cause the CPU 11 of the storage device 1 to receive the device identification information and protection function information from the data processing devices 2, 2, ... and classify the device identification information based on the protection function information in advance, and then cause the CPU 11 to perform the process of receiving only the setting information and device identification information at step S11.

If the setting information, device identification information and protection function information are not received at step S11 (S11: NO), the CPU 11 continues to monitor the reception of the setting information, device identification information and protection function information. If the setting information, device identification information and protection function information are received at step S11 (S11: YES), the CPU 11 determines whether or not the received setting information is encrypted setting information produced by encrypting the received setting information (S12). If the received setting information is encrypted (S12: YES), the CPU 11 records the encrypted setting information into the management data in association with the device identification information (S13) as shown in FIG. 4, and finishes the process.

At step S12, if the setting information is not encrypted (S12: NO), the CPU 11 determines, based on the protection function information, whether or not the data processing device 2 which sent the setting information has the data protection function (S14). Note that in a mode in which the data processing device 2 is classified in advance, the CPU 11 determines whether the device identification information is classified as a data processing device 2 having the data protection function or a data processing device 2 having no data protection function. At step S14, if the CPU 11 determines that the data processing device 2 which sent the setting information has the data protection function (S14: YES), then it classifies the data processing device 2 as a data processing device having the data protection function and records the device identification information and setting information into the management data (S15), and finishes the process. At step S14, if the CPU 11 determines that the data processing device 2 which sent the setting information does not have the data protection function (S14: NO), then it classifies the data processing device 2 as a data processing device having no data protection function and records the device identification information and setting information into the management data (S16), and finishes the process.

Through the above-mentioned processes, the setting information necessary for processing data in the data processing devices 2, 2, ... is classified according to whether or not the data processing device 2 has the data protection function, and backed up to the storage device 1.

Figure 6:
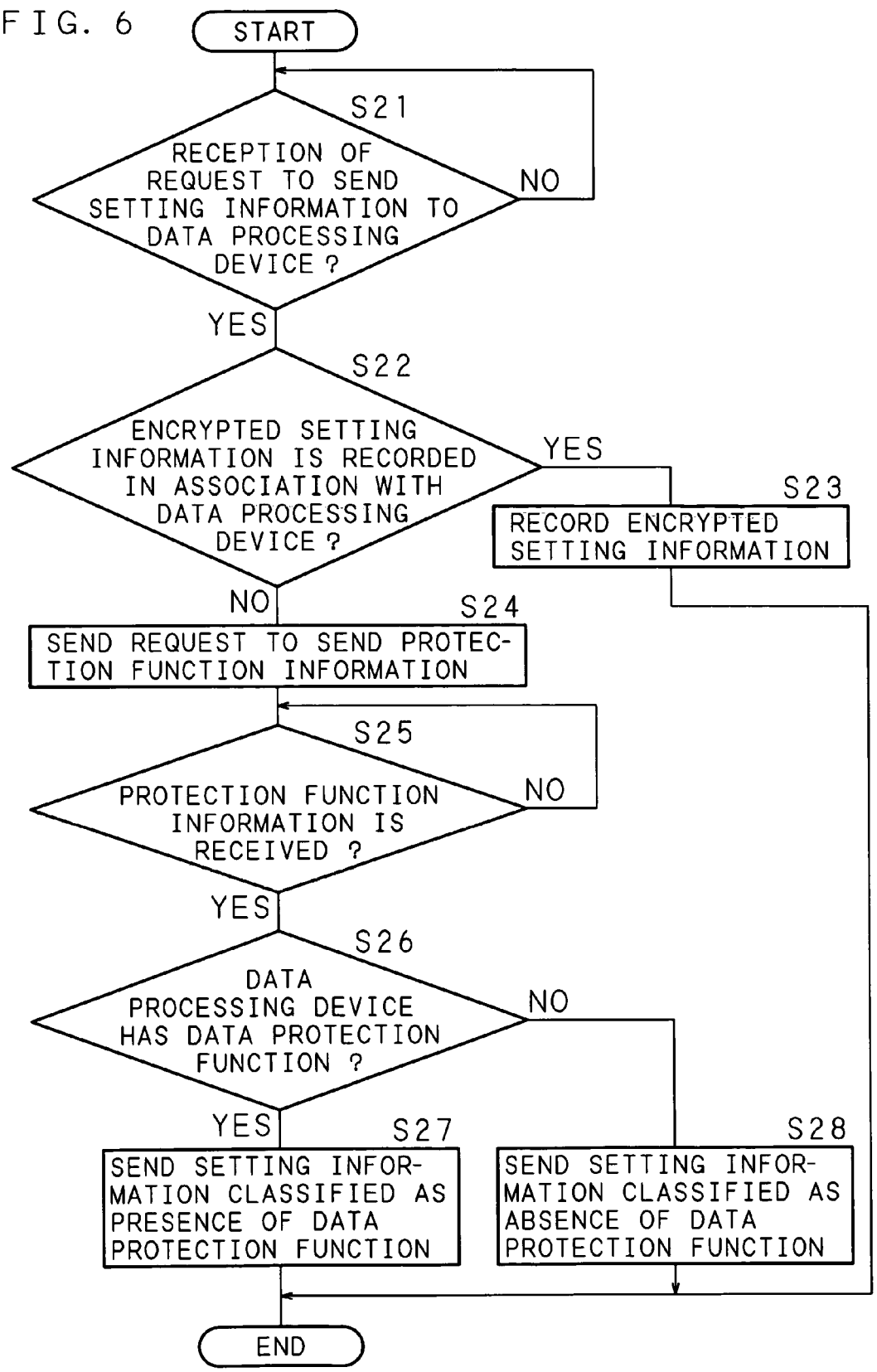
FIG. 6 is a flowchart showing the procedure of sending the setting information to a data processing device by the storage device of the present invention.

FIG. 6 is a flowchart showing the procedure of sending the setting information to the data processing device 2 by the storage device 1 of the present invention. The CPU 11 of the storage device 1 performs the following processes, according to the computer program 100 loaded into the RAM 12. The CPU 11 monitors the reception of a request to send the setting information to a specified data processing device 2 by either receiving by the communication unit 17 the request to send the setting information from the data processing device 2, or receiving the request to send the setting information through the input device 15 operated by the user (S21) If the request to send the setting information is not received (S21: NO), the CPU 11 continues to monitor the reception of the request to send the setting information. If the request to send the setting information is received (S21: YES), then the CPU 11 determines whether or not the encrypted setting information is recorded in the management data in association with the device identification information of the data processing device 2 specified as the recipient of the setting information (S22). If the encrypted setting information is recorded (S22: YES), then the CPU 11 causes the communication unit 17 to send the encrypted setting information recorded in association with the specified data processing device 2 to this data processing device 2 (S23), and finishes the process. The data processing device 2 which received the encrypted setting information stores the encrypted setting information in the management unit 27, and performs data processing based on the encrypted setting information.

At step S22, if the encrypted setting information is not recorded in the management data in association with the specified data processing device 2 (S22: NO), then the CPU 11 causes the communication unit 17 to send a request to send the protection function information to the data processing device 2 specified as the recipient of the setting information (S24). Next, the CPU 11 monitors the reception of the protection function information to be sent from the data processing device 2 as the recipient of the request to send the protection function information in the communication unit 17 (S25). If the protection function information is not received (S25: NO), the CPU 11 continues to monitor the reception of the protection function information. If the communication unit 17 receives the protection function information from the data processing device 2 (S25: YES), then the CPU 11 determines, based on the received protection function information, whether or not the data processing device 2 which is the recipient of the setting information has the data protection function (S26). If the CPU 11 determines that the data processing device 2 as the recipient of the setting information has the data protection function (S26: YES), then the CPU 11 causes the communication unit 17 to send a plurality of pieces of setting information recorded in the management data under the classification group having the data protection function to the data processing device 2 specified as the recipient of the setting information (S27). If the CPU 11 determines that the data processing device 2 as the recipient of the setting information does not have the data protection function (S26: NO), then the CPU 11 causes the communication unit 17 to send a plurality of pieces of setting information recorded in the management data under the classification group having no data protection function to the data processing device 2 specified as the recipient of the setting information (S28). After finishing step S27 or step S28, the CPU 11 finishes the process.

According to the above-mentioned processes, when a data processing device 2 which requires input of the setting information, such as a data processing device 2 from which the contents of the setting information are lost or a new data processing device 2, stores the setting information in the management unit 27, it can perform data processing based on the setting information.

In the above-mentioned processes, although the storage device 1 sends the setting information corresponding to the classification group of the data processing device 2 which is the recipient of the setting information among the classified setting information, it may also be possible to perform the processing of sending specified setting information. FIG. 7 is a flowchart showing the procedure of sending specified setting information to the data processing device 2. The CPU 11 of the storage device 1 performs the following processes, according to the computer program 100 loaded into the RAM 12.

The CPU 11 monitors whether setting information to be sent to a specific data processing device 2 has been specified by either receiving by the communication unit 17 a request to send the setting information from the data processing device 2, or receiving a request to send the setting information through the input device 15 operated by the user (S301). If no setting information has been specified (S301: NO), the CPU 11 continues to monitor whether setting information has been specified. If setting information to be sent has been specified (S301: YES), then the CPU 11 determines whether or not the specified setting information is the encrypted setting information (S302). If the specified setting information is the encrypted setting information (S302: YES), then the CPU 11 determines whether or not the device identification information corresponding to the specified encrypted setting information in the management data matches the device identification information of the data processing device 2 specified as the recipient (S303). If these pieces of device identification match (S303: YES), then the CPU 11 causes the communication unit 17 to send the specified encrypted setting information to the specified data processing device 2 (S304), and finishes the process. If these pieces of device identification do not match (S303: NO), then the CPU 11 outputs information indicating that the transmission of the setting information is not allowed by sending the information to the data processing device 2, outputting the information to the output device 16, or other method (S305), and finishes the process.

At step S302, if the specified setting information is not the encrypted setting information (S302: NO), then the CPU 11 causes the communication unit 17 to send a request to send the protection function information to the data processing device 2 specified as the recipient of the setting information (S306). Next, the CPU 11 monitors the reception of the protection function information, which is sent from the data processing device 2 to which the request to send the protection function information was sent, in the communication unit 17 (S307). If the protection function information is not received (S307: NO), the CPU 11 continues to monitor the reception of the protection function information. If the communication unit 17 receives the protection function information (S307: YES), then the CPU 11 determines, based on the received protection function information, whether or not a classification group in which the data processing device 2 as the recipient of the setting information is classified according to the presence or absence of the data protection function matches a classification group in which the device identification information corresponding to the setting information to be sent is classified according to the presence or absence of the data protection function (S308). If their classification groups according to the presence or absence of the data protection function match (S308: YES), then the CPU 11 causes the communication unit 17 to send the specified setting information to the data processing device 2 specified as the recipient of the setting information (S309), and finishes the process. If their classification groups according to the presence or absence of the data protection function do not match (S308: NO), then the CPU 11 outputs information indicating that the transmission of the setting information is not allowed by sending the information to the data processing device 2, outputting the information to the output device 16, or other method (S310), and finishes the process.

As described in detail above, in the present invention, the storage device 1 for storing the setting information necessary for a data processing device 2 to process data classifies the data processing device 2 according to whether or not the data processing device 2 has the data protection function and stores the setting information received from the data processing device 2 in association with a classification group in which the data processing device 2 is classified, and when sending the setting information to a data processing device 2, the storage device 1 sends the setting information corresponding to a classification group in which the data processing device 2 as the recipient of the setting information is classified. Thus, by using the setting information stored in the storage device 1, it is possible to easily perform the process of inputting the setting information into the data processing device 2, such as inputting the setting information again into the data processing device 2 or inputting the setting information into new data processing device 2, and it is simultaneously possible to prevent the setting information of a data processing device 2 which handles confidential data because it has the data protection function from being sent to a data processing device 2 which does not handle confidential data because it does not have the data protection function. Hence, it is possible to prevent leakage of confidential information, such as information showing customers contained in the setting information stored in a data processing device 2 handling confidential data, information showing the user, and the encryption key when the data is encrypted.

Moreover, in the present invention, since the encrypted setting information can be sent only to a data processing device 2 which sent this encrypted setting information, it is possible to prevent leakage of confidential information contained in the setting information whose contents are protected by encryption to other data processing devices 2.

Note that although the present embodiment illustrates a mode in which the storage device 1 classifies a data processing device 2 according to whether or not the data processing device 2 has the data protection function, the present invention is not limited to this mode and may be implemented in a mode in which a data processing device 2 is more finely classified according to the strength of protecting data by the data protection function, such as a type of encryption or the number of times the processed data is invalidated. Further, although the present embodiment illustrates a mode in which the storage device 1 performs the process of classifying a data processing device 2 according to the data protection function, the present invention is not limited to this mode and may be implemented in a mode in which the storage device 1 performs the process of classifying a data processing device 2 based on other criteria, such as the user of the data processing device 2, the location and environment where the data processing device 2 is installed, the area in which the data processing device 2 can communicate, and the confidential degree of the contents of the setting information stored in the data processing device 2.

Besides, although the present embodiment illustrates a mode in which the storage device 1 of the present invention is constructed using a server, it may also be possible to implement the present invention in a mode in which a data processing device 2 such as a facsimile machine or a printer has the function of executing processes which are to be performed by the storage device 1.

Additionally, in the present embodiment, although a data processing device 2 according to the present invention is a multifunction machine having a plurality of functions such as a facsimile machine and printer, it is not limited to this and may be a device having the function of a single machine such as a facsimile machine, a copying machine, or a printer. Further, a data processing device 2 according to the present invention may be an information processing device such as a PC connected to the communication network Ni and having a function for performing facsimile communication.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data processing system comprising:
a plurality of data processing devices; and
a storage device to which said plurality of data processing devices are connected,
wherein the data processing device comprises:
setting information storage means for storing setting information necessary for processing data; and
means for sending the setting information stored in the setting information storage means to the storage device, and
the storage device comprises:
classification storage means for storing the setting information sent from the data processing device in association with a classification group in which the data processing device which sent the setting information is classified according to a predetermined condition;
means for receiving a transmission request to send the setting information stored in said classification storage means to one data processing device;
means for recognizing a predetermined condition in said one data processing device when said means receives the transmission request;
means for selecting a setting information to be sent from the setting information stored in said classification storage means on the basis of the recognized predetermined condition in said one data processing device, and sending the selected setting information to said one data processing device;
means for receiving, from an external data processing device, protection function information showing strength of a data protection function for protecting data to be processed by the data processing device;
means for classifying the external data processing device according to the strength of the data protection function as the predetermined condition, based on the protection function information received by said means;
means for receiving, from an external data processing device, encrypted setting information produced by encrypting setting information necessary for processing data in the data processing device;
means for storing the encrypted setting information received by said means;
means for sending the encrypted setting information stored in said means to the data processing device which sent the encrypted setting information; and
means for prohibiting the encrypted setting information from being sent to a data processing device other than the data processing device which sent the encrypted setting information.

2. The data processing system of claim 1,
wherein the predetermined condition is whether or not said one data processing device has a data protection function for protecting data to be processed.

3. A data processing system comprising:
a plurality of data processing devices; and
a storage device to which said plurality of data processing devices are connected,
wherein the data processing device comprises:
a setting information storage unit for storing setting information necessary for processing data; and
a transmission unit for sending the setting information stored in the setting information storage unit to the storage device, and
the storage device comprises:
a classification storage unit for storing the setting information sent from the data processing device in association with a classification group in which the data processing device which sent the setting information is classified according to a predetermined condition;
a processor capable of performing the following operations,
(i) receiving a transmission request to send the setting information stored in the classification storage unit to one data processing device, and
(ii) recognizing a predetermined condition in said one data processing device when the transmission request is received;
a transmission unit for selecting a setting information to be sent from the setting information stored in the classification storage unit on the basis of the recognized predetermined condition in said one data processing device, and sending the selected information to said one data processing device;
means for receiving, from an external data processing device, protection function information showing strength of a data protection function for protecting data to be processed by the data processing device;
means for classifying the external data processing device according to the strength of the data protection function as the predetermined condition, based on the protection function information received by said means;
means for receiving, from an external data processing device, encrypted setting information produced by encrypting setting information necessary for processing data in the data processing device;
means for storing the encrypted setting information received by said means;
means for sending the encrypted setting information stored in said means to the data processing device which sent the encrypted setting information; and
means for prohibiting the encrypted setting information from being sent to a data processing device other than the data processing device which sent the encrypted setting information.

4. The data processing system of claim 3,
wherein the predetermined condition is whether or not said one data processing device has a data protection function for protecting data to be processed.

5. A storage device comprising:
receiving means for receiving, from an external data processing device, setting information necessary for processing data in the data processing device;
classification storage means for storing the setting information received by the receiving means in association with a classification group in which the data processing device which sent the setting information is classified according to a predetermined condition;
means for receiving a transmission request to send the setting information stored in said classification storage means to an external data processing device;

means for recognizing a predetermined condition in the external data processing device when said means receives the transmission request;
means for selecting a setting information to be sent from the setting information stored in said classification storage means on the basis of the recognized predetermined condition in the external data processing device, and sending the selected setting information to said external data processing device;
means for receiving, from an external data processing device, protection function information showing strength of a data protection function for protecting data to be processed by the data processing device;
means for classifying the external data processing device according to the strength of the data protection function as the predetermined condition, based on the protection function information received by said means;
means for receiving, from an external data processing device, encrypted setting information produced by encrypting setting information necessary for processing data in the data processing device;
means for storing the encrypted setting information received by said means;
means for sending the encrypted setting information stored in said means to the data processing device which sent the encrypted setting information; and
means for prohibiting the encrypted setting information from being sent to a data processing device other than the data processing device which sent the encrypted setting information.

6. The storage device of claim 5, further comprising:
means for receiving, from an external data processing device, protection function information showing whether or not the data processing device has a data protection function for protecting data to be processed; and
means for classifying the external data processing device according to the presence or absence of the data protection function as the predetermined condition, based on the protection function information received by said means.

7. A storage device comprising:
a receiving unit for receiving, from an external data processing device, setting information necessary for processing data in the data processing device;
a classification storage unit for storing the setting information received by the receiving unit in association with a classification group in which the data processing device which sent the setting information is classified according to a predetermined condition;
a receiving unit for receiving, from an external data processing device, protection function information showing strength of a data protection function for protecting data to be processed by the data processing device,
wherein said processor is capable of performing the following operation,
classifying the external data processing device according to the strength of the data protection function as the predetermined condition, based on the received protection function information;
a receiving unit for receiving, from an external data processing device, encrypted setting information produced by encrypting setting information necessary for processing data in the data processing device;
a storage unit for storing the received encrypted setting information; and
a transmission unit for sending the stored encrypted setting information to the data processing device which sent the encrypted setting information,
wherein said processor is capable of performing the following operation,
prohibiting the encrypted setting information from being sent to a data processing device other than the data processing device which sent the encrypted setting information;
a processor capable of performing the following operations,
(i) receiving a transmission request to send the setting information stored in the classification storage unit to an external data processing device, and
(ii) recognizing a predetermined condition in the external data processing device when the transmission request is received; and
a transmission unit for selecting a setting information to be send from the setting information stored in the classification storage unit on the basis of the recognized predetermined condition in the external data processing device, and sending the selected setting information to said external data processing device.

8. The storage device of claim 7, further comprising:
a receiving unit for receiving, from an external data processing device, protection function information showing whether or not the data processing device has a data protection function for protecting data to be processed,
wherein said processor is capable of performing the following operation,
(iii) classifying the external data processing device according to the presence or absence of the data protection function as the predetermined condition, based on the received protection function information.

9. A memory product storing a computer program for causing a computer to store setting information received from an external data processing device and necessary for processing data in the data processing device, said computer program comprising the steps of:
causing the computer to store the received setting information in association with a classification group in which the data processing device which sent the setting information is classified according to a predetermined condition;
causing the computer to classify the external data processing device according to the predetermined condition when a transmission request to send the stored setting information to an external data processing device is received; and
causing the computer to select, as the setting information to be sent to the external data processing device, the setting information stored in association with a classification group in which the external data processing device is classified;
receiving, from an external data processing device, protection function information showing strength of a data protection function for protecting data to be processed by the data processing device,
wherein said processor performs the following operation,
classifying the external data processing device according to the strength of the data protection function as the predetermined condition, based on the received protection function information;
receiving, from an external data processing device, encrypted setting information produced by encrypting setting information necessary for processing data in the data processing device;

storing the received encrypted setting information; and
sending the stored encrypted setting information to the data processing device which sent the encrypted setting information,
wherein said processor is capable of performing the following operation,
prohibiting the encrypted setting information from being sent to a data processing device other than the data processing device which sent the encrypted setting information.

10. The memory product of claim 9, wherein the predetermined condition is whether or not the external data processing device has a data protection function for protecting data to be processed.

* * * * *